(12) United States Patent
Hooper et al.

(10) Patent No.: US 7,240,164 B2
(45) Date of Patent: Jul. 3, 2007

(54) FOLDING FOR A MULTI-THREADED NETWORK PROCESSOR

(75) Inventors: Donald F. Hooper, Shrewsbury, MA (US); Hugh Wilkinson, Newton, MA (US); Mark Rosenbluth, Uxbridge, MA (US); Debra Bernstein, Sudbury, MA (US); Michael F. Fallon, Mendon, MA (US); Sanjeev Jain, Shresbury, MA (US); Myles J. Wilde, Charlestown, MA (US); Gilbert M. Wolrich, Framingham, MA (US)

(73) Assignee: Intel Corporation, Santa Clara, CA (US)

( * ) Notice: Subject to any disclaimer, the term of this patent is extended or adjusted under 35 U.S.C. 154(b) by 381 days.

(21) Appl. No.: 10/642,061

(22) Filed: Aug. 14, 2003

(65) Prior Publication Data

US 2005/0038964 A1 Feb. 17, 2005

(51) Int. Cl.
*G06F 12/00* (2006.01)
*G06F 13/00* (2006.01)

(52) U.S. Cl. .................... 711/143; 711/147; 718/107

(58) Field of Classification Search ............... None
See application file for complete search history.

(56) References Cited

U.S. PATENT DOCUMENTS

2001/0000046 A1* 3/2001 Wright et al. ............ 712/11
2003/0041216 A1* 2/2003 Rosenbluth et al. ........ 711/141
2003/0046488 A1* 3/2003 Rosenbluth et al. ........ 711/108
2003/0135351 A1* 7/2003 Wilkinson et al. .......... 702/186
2005/0005088 A1* 1/2005 Yearsley et al. ............ 712/235

OTHER PUBLICATIONS

Adiletta, M. et al., "The Next Generation of Intel IXP Network Processors", Intel Technology Journal, vol. 6, Issue 3, Aug. 15, 2002, pp. 6-18.*
Oberg, J. et al., "Revolver: a high-performance MIMD architecture for collision free computing," IEEE Euromicro Conference, 1998. Proceedings. 24th, vol. 1, pp. 301-308.*
Adiletta, Matthew, et al., "Packet over SONET: Achieving 10 Gigabit/sec Packet Processing with an IXP2800", *Intel Technology Journal*, vol. 6, Issue 3, (2002), pp. 29-39.
Johnson, Erik, et al., "IXP1200 Programming", *Intel Press*, Chapter 13, (2002), pp. 291-311.

* cited by examiner

*Primary Examiner*—Matthew Kim
*Assistant Examiner*—Michael Krofcheck
(74) *Attorney, Agent, or Firm*—Daly, Crowley, Mofford & Durkee, LLP

(57) ABSTRACT

A mechanism to process units of data associated with a dependent data stream using different threads of execution and a common data structure in memory. Accessing the common data structure in memory for the processing uses a single read operation and a single write operation. The folding of multiple read-modify-write memory operations in such a manner for multiple multi-threaded stages of processing includes controlling a first stage, which operates on the same data unit as a second stage to pass context state information to the second stage for coherency.

29 Claims, 13 Drawing Sheets

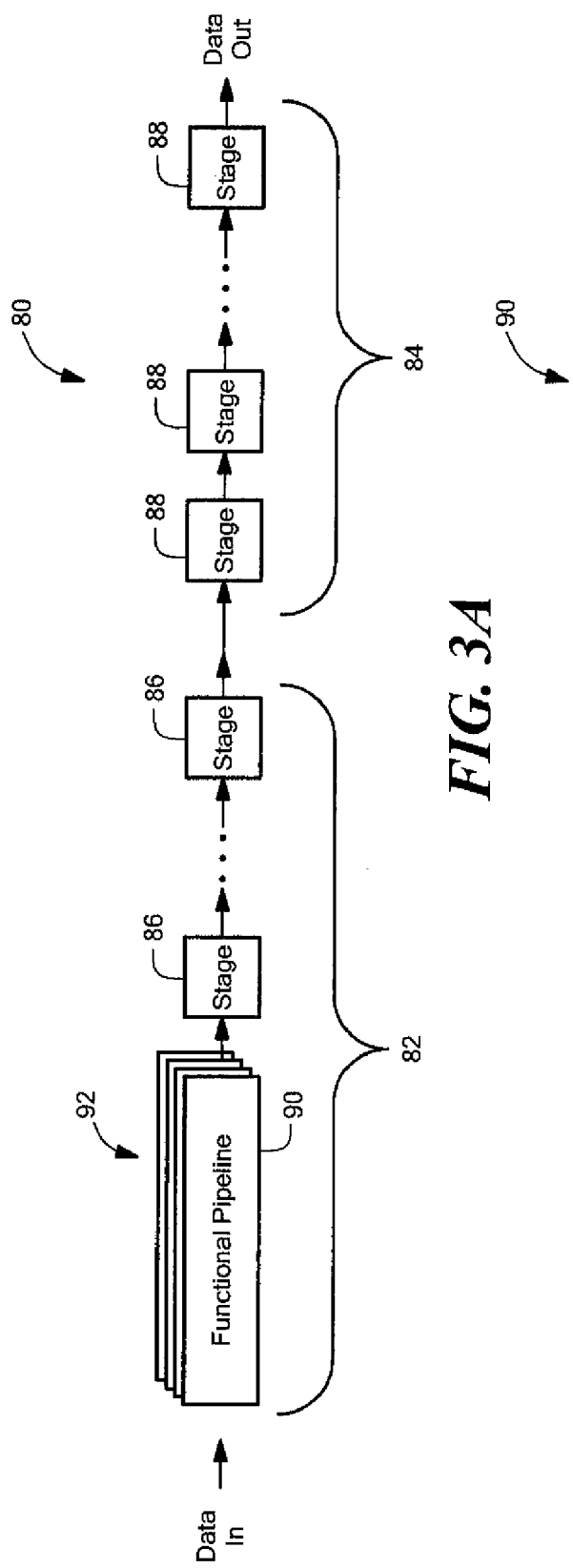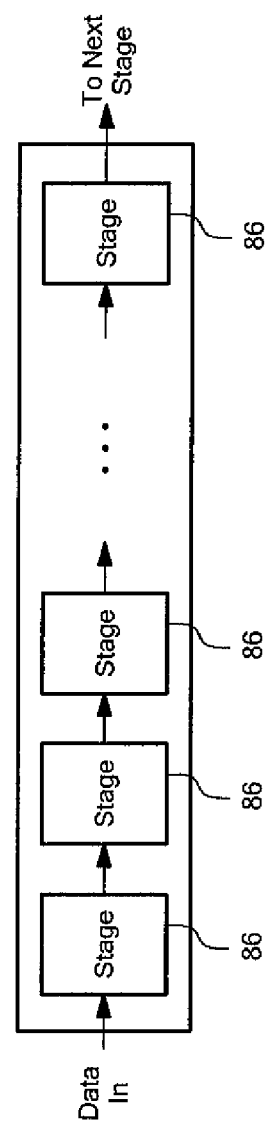
FIG. 3A
FIG. 3B

FOLDING FOR A MULTI-THREADED NETWORK PROCESSOR

BACKGROUND

Network processors often use parallel processes to achieve high performance when processing data units, e.g., packets or cells, from multiple streams of traffic. The data units to be processed may be related to each other, for example, data units associated with the same flow. If multiple processes need to access common data structures in memory, the benefits of parallelism can be lost as the processing of the data units instead occurs in a serialized manner. The serialized processing can cause memory latency efficiency and significant performance degradation.

DESCRIPTION OF THE DRAWINGS

FIGS. 3A-3B are diagrams depicting the MEs arranged as a pipeline of ingress processing stages, including a receive (RX) pipeline and a transmit (TX) pipeline.

DETAILED DESCRIPTION

Figure 1:
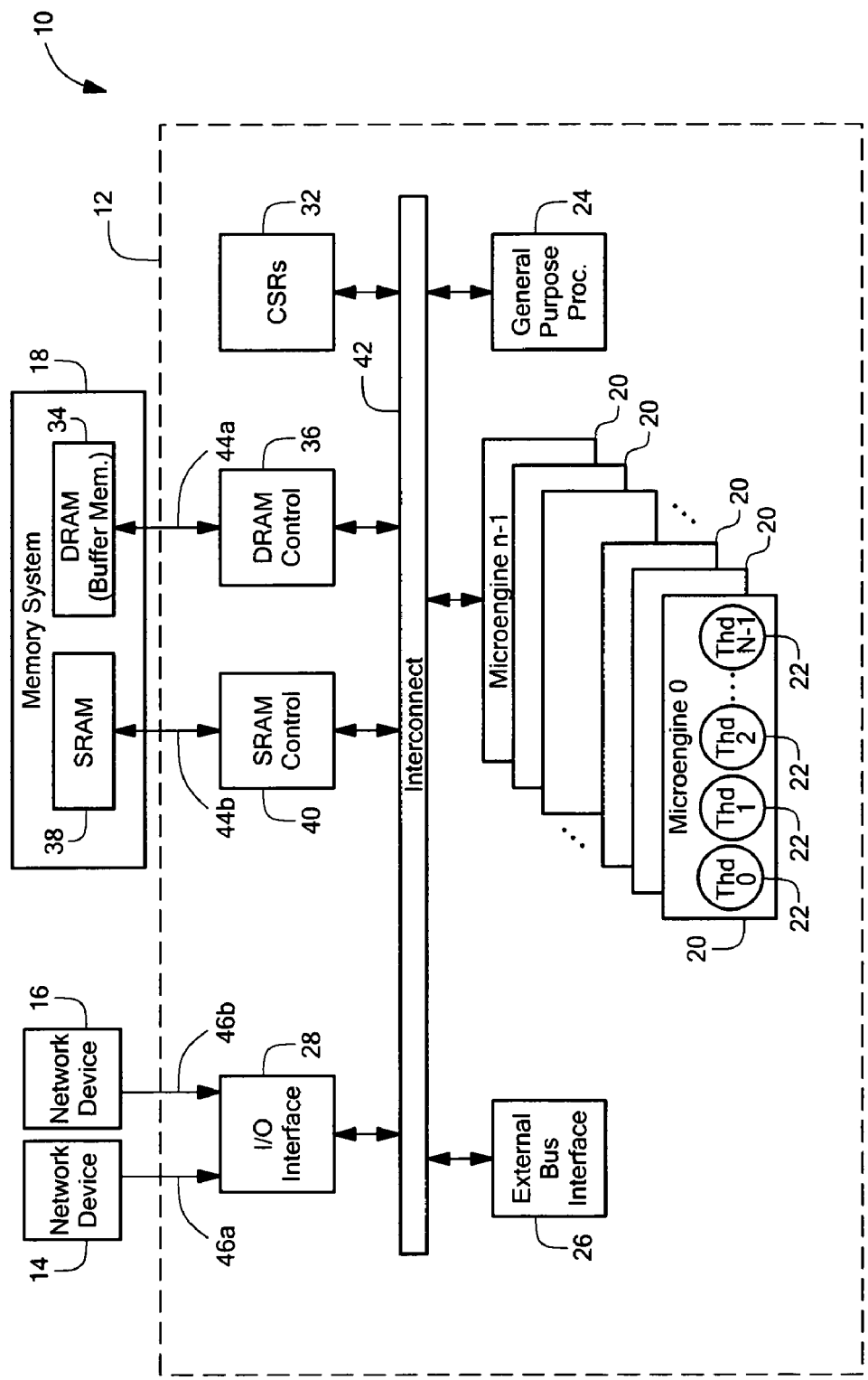
FIG. 1 is a block diagram of a communication system employing a processor having multi-threaded microengines (MEs).

Referring to FIG. 1, a communication system 10 includes a processor 12 coupled to one or more I/O devices, for example, network devices 14 and 16, as well as a memory system 18. The processor 12 includes multiple processors ("microengines" or "MEs") 20, each with multiple hardware controlled execution threads 22. In the example shown, there are "n" microengines 20, and each of the microengines 20 is capable of processing multiple threads 22, as will be described more fully below. In the described embodiment, the maximum number "N" of threads supported by the hardware is eight. Each of the microengines 20 is connected to and can communicate with adjacent microengines. The microengines 20 employ an optimized signaling mechanism to control thread execution for improved performance, as will be described.

In one embodiment, the processor 12 also includes a processor 24 that assists in loading microcode control for the microengines 20 and other resources of the processor 12, and performs other general-purpose computer type functions such as handling protocols and exceptions. In network processing applications, the processor 24 can also provide support for higher layer network processing tasks that cannot be handled by the microengines 20.

The microengines 20 each operate with shared resources including, for example, the memory system 18, an external bus interface (e.g., a Peripheral Chip Interconnect or "PCI" bus interface) 26, an I/O interface 28 and Control and Status Registers (CSRs) 32. The I/O interface 28 is responsible for controlling and interfacing the processor 12 to the network devices 14, 16. The memory system 18 includes a Dynamic Random Access Memory (DRAM) 34, which is accessed using a DRAM controller 36 and a Static Random Access Memory (SRAM) 38, which is accessed using an SRAM controller 40. Although not shown, the processor 12 also would include a nonvolatile memory to support boot operations. The DRAM 34 and DRAM controller 36 are typically used for processing large volumes of data, e.g., processing of payloads from network packets. In a networking implementation, the SRAM 38 and SRAM controller 40 are used for low latency, fast access tasks, e.g., accessing look-up tables, storing buffer descriptors and free buffer lists, and so forth.

The devices 14 and 16 can be any network devices capable of transmitting and/or receiving network traffic data, such as framing/MAC devices, e.g., for connecting to 10/100BaseT Ethernet, Gigabit Ethernet, ATM or other types of networks, or devices for connecting to a switch fabric. For example, in one arrangement, the network device 14 could be an Ethernet MAC device (connected to an Ethernet network, not shown) that transmits data to the processor 12 and device 16 could be a switch fabric device that receives processed data from processor 12 for transmission onto a switch fabric. In such an implementation, that is, when handling traffic to be sent to a switch fabric, the processor 12 would be acting as an ingress network processor. Alternatively, the processor 12 could operate as an egress network processor, handling traffic that is received from a switch fabric (via device 16) and destined for another network device such as network device 14, or network coupled to such device.

Although the processor 12 can operate in a standalone mode, supporting both traffic directions, it will be understood that, to achieve higher performance, it may be desirable to use two dedicated processors, one as an ingress processor and the other as an egress processor. The two dedicated processors would each be coupled to the devices 14 and 16. In addition, each network device 14, 16 can include a plurality of ports to be serviced by the processor 12. The I/O interface 28 therefore supports one or more types of interfaces, such as an interface for packet and cell transfer between a PHY device and a higher protocol layer (e.g., link layer), or an interface between a traffic manager and a switch fabric for Asynchronous Transfer Mode (ATM), Internet Protocol (IP), Ethernet, and similar data communications applications. The I/O interface 28 may include separate receive and transmit blocks, and each may be separately configurable for a particular interface supported by the processor 12.

Other devices, such as a host computer and/or bus peripherals (not shown), which may be coupled to an external bus controlled by the external bus interface 26 can also serviced by the processor 12.

In general, as a network processor, the processor 12 can interface to any type of communication device or interface that receives/sends data. The processor 12 functioning as a network processor could receive units of information from a network device like network device 14 and process those units in a parallel manner, as will be described. The unit of information could include an entire network packet (e.g., Ethernet packet) or a portion of such a packet, e.g., a cell such as a Common Switch Interface (or "CSIX") cell or ATM cell, or packet segment. Other units are contemplated as well. Because the MEs can be configured to operate on such units of information, or units of information associated with or that describes those units of information, such as data context, all types of units of information handled by the MEs 20 will be referred to herein generally as "data units".

Each of the functional units of the processor 12 is coupled to an interconnect 42. Memory busses 44a, 44b couple the memory controllers 36 and 40, respectively, to respective memory units DRAM 34 and SRAM 38 of the memory system 18. The I/O Interface 28 is coupled to the devices 14 and 16 via separate I/O bus lines 46a and 46b, respectively.

Figure 2:
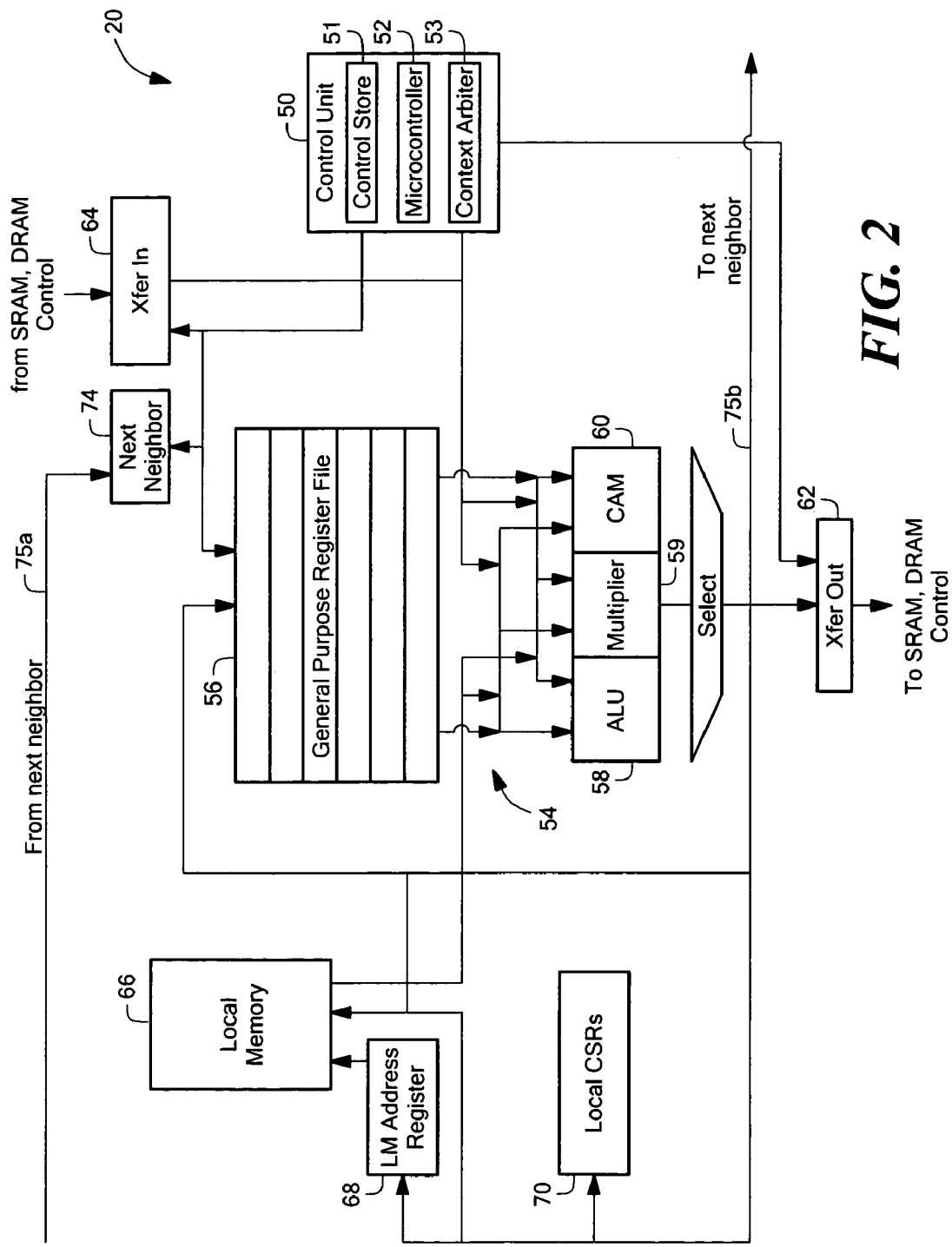
FIG. 2 is a block diagram of an exemplary microengine (ME) including a Content Addressable Memory (CAM) and local memory.

Referring to FIG. 2, an exemplary one of the microengines 20 is shown. The microengine (ME) 20 includes a control unit 50 that includes a control store 51, control logic (or microcontroller) 52 and context arbiter/event logic 53. The control store 51 is used to store a microprogram. The microprogram is loadable by the processor 24.

The microcontroller 52 includes an instruction decoder and program counter units for each of the supported threads. The context arbiter/event logic 53 can receive messages from any of the shared resources, e.g., SRAM 38, DRAM 34, or processor core 24, and so forth. These messages provides information on whether a requested function has been completed.

The microengine 20 also includes an execution datapath 54 and a general purpose register (GPR) file unit 56 that is coupled to the control unit 50. The datapath 54 may include a number of different datapath elements, e.g., and as shown, an ALU 58, a multiplier 59 and a Content Addressable Memory (CAM) 60.

The registers of the GPR file unit 56 are read and written exclusively under program control. The GPRs, when used as a source in an instruction, supply operands to the datapath 54. When used as a destination in an instruction, they are written with the result of the datapath 54. The instruction specifies the register number of the specific GPRs that are selected for a source or destination. Opcode bits in the instruction provided by the control unit 50 select which datapath element is to perform the operation defined by the instruction.

The microengine 20 further includes a write transfer register file 62 and a read transfer register file 64. The write transfer register file 62 stores data to be written to a resource external to the microengine (for example, the DRAM memory or SRAM memory). The read transfer register file 64 is used for storing return data from a resource external to the microengine 20. Both of the transfer register files 62, 64 are connected to the datapath 54, as well as the control store 50. Also included is a local memory 66. The local memory 66, which is addressed by registers 68, can supply operands to the datapath 54 and receive results from the datapath 54 as a destination.

The microengine 20 also includes local control and status registers (CSRs) 70, coupled to the transfer registers, for storing local inter-thread and global event signaling information, as well as other control and status information. Other storage and functions units, for example, a Cyclic Redundancy Check (CRC) unit (not shown), may be included in the microengine as well.

Also provided in the microengine 20 are next neighbor registers 74, coupled to the control store 50 and the execution datapath 54, for storing information received from a previous neighbor ME in pipeline processing over a next neighbor input signal 75a, or from the same ME, as controlled by information in the local CSRs 70. A next neighbor output signal 75b to a next neighbor ME in a processing pipeline can be provided under the control of the local CSRs 70.

Referring to FIGS. 3A-3B, an exemplary software processing pipeline model 80 of the processor 12 is shown. In this example, the processor 12 is configured as an ingress network processor that supports two pipelines, a receive (RX) pipeline 82 and a transmit (TX) pipeline 84.

The RX pipeline 82, which includes RX pipeline stages 86, begins with data arriving in a receive block of the I/O interface 28 and ends with the enqueuing of data for transmission in the port (or transmit) queues (store in SRAM 38). The TX pipeline 84 include multiple TX stages 88 that, collectively, perform queue management, transmit scheduling and data transmit functions, as well as any other functions specified by a user for a particular application.

The pipeline 80 may include both context stages as well as stages in a functional pipeline (functional stages). In the example shown in FIGS. 3A-3B, the RX pipeline 82 includes a functional pipeline 90 that runs on multiple MEs (to implement a multiprocessor functional pipeline 92). As shown in FIG. 3A, the functional pipeline 90 includes multiple RX stages 86. Unlike context stages, each of which corresponds to a different task performed by a single (different) ME (as defined by the microcode loaded into that ME), the stages of the functional pipeline correspond to different tasks or microcode blocks that execute on the same ME as time progresses.

Thus, in the software processing pipeline model 80, the each data unit (such as a packet, for example) received from an I/O device is processed by multiple tasks with each task running on either one or multiple microengines as a processing stage. Information that describes the received data unit (sometimes referred to as data context, state or metadata) is passed along the pipeline 80 until the processed data unit is transmitted to a port of one of the network devices 14, 16.

Some of the stages operate on a "critical section" of code, that is, a code section for which only one ME thread has exclusive modification privileges for a global resource at any one time. These privileges protect coherency during read-modify-write operations. Exclusive modification privileges between MEs are handled by allowing only one ME (one stage) to modify the section. In addition, strict thread order execution is maintained in the pipeline at critical section code points to ensure sequence management of related data units, such as data units associated with the same flow, being handled by different threads.

The processor 12 supports a memory latency minimizing mechanism called "folding" to reduce processing times and improve the speed at which the processor 12 operates with respect to incoming traffic. In particular, to minimize the latency associated with the modification of critical data when processing dependent data streams, that is, data streams including related units of data requiring access to a common data structure in external memory during processing, multiple reads and writes can be folded into a minimum of one external memory read and one external write. When all of the data units are related, folding results in a single external memory read and a single external memory write, as will be described later with reference to FIGS. 5A-5B.

Moreover, folding can address the memory latency problem associated with dependency checking in critical sections of code.

In the illustrated embodiment, the local memory 66 (FIG. 2) caches information stored in external memory, for example, data structures maintained in the SRAM 38. These data structures may include, for example, queue descriptors, lookup table entries and lists, which are used by the threads to store context state for a particular function. If, for a particular application function, such as metering, more than one thread in a stage is required to modify the same critical data, a latency penalty is incurred if each thread reads the data from external memory (such as SRAM 38), modifies it (after performing some type of computation) and writes the data back to the external memory. To reduce the latency penalty associated with the read and write, the ME threads can use the ME CAM 60 and the local memory 66 to fold these operations into a single read, multiple modifications and, depending on the cache eviction policy, either one or more write operations, as will be described.

Figure 4:
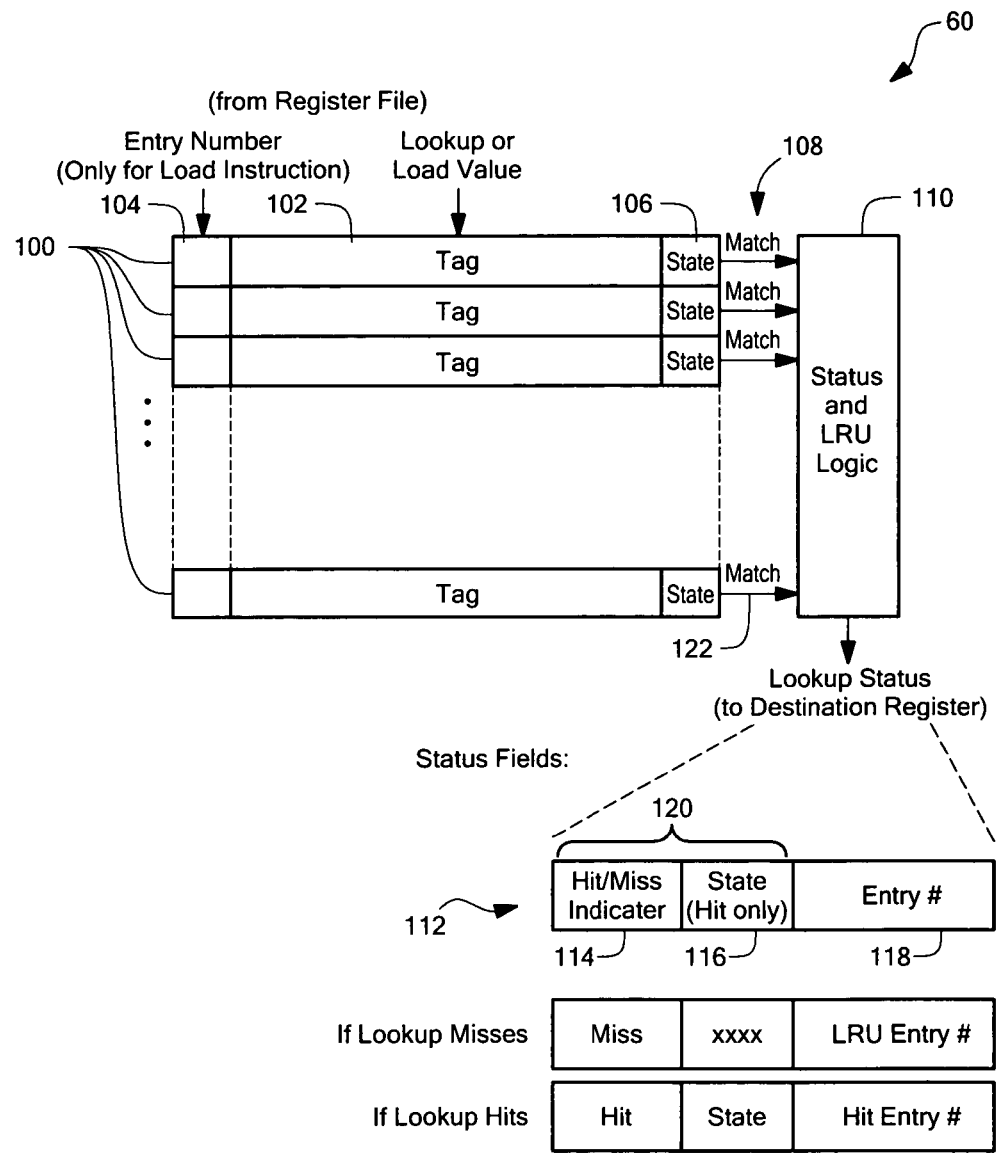
FIG. 4 is a block diagram of the CAM of FIG. 2.

It is helpful at this point to describe the role of the CAM 60 as it relates to local memory caching. Referring to FIG. 4, in an exemplary implementation, the CAM 60 includes a plurality of entries 100. Each entry 100 has an identifier value (or tag) 102, e.g., a queue number or memory address that can be compared against an input lookup value. Each entry also includes an entry number 104 and state information 106 associated with the identifier 102 in that same entry. Compare results 108 are provided to a Status and LRU logic unit 110, which produces a lookup result 112. The lookup result 112 includes a hit/miss indicator 114, state information 116 and an entry number 118. Collectively, the fields 114 and 116 provide status 120.

During a CAM lookup operation, the value presented from a source such as the GPR file 56 is compared, in parallel, to each identifier 102 with a resulting Match signal 122 per identifier.

The identifier 102 is compared against the lookup value in a source operand by an instruction. The source operand holds the lookup value to be applied to the CAM 60 for lookup. A specified destination register receives the result of the CAM lookup 60. The destination register can be a register in the GPR file 56. Optionally, the lookup result 112 can also be written into the LM address registers 68 (FIG. 2) of the ME 20.

All entries 100 are compared in parallel. For a hit (that is, when the hit/miss indicator 114 of the result 112 indicates a hit), the entry number 118 is the entry number of the entry that matched. When a miss occurs and the hit/miss indicator 114 thus indicates a miss, the entry number 118 is the entry number of the Least Recently-Used (LRU) entry in the CAM array. The state information 116 is only useful for a hit and includes the value in the state field 116 for the entry that hit.

The LRU logic 110 maintains a time-ordered list of CAM entry usage. When an entry is loaded, or matches on a lookup, it is moved to a position of Most Recently Used (MRU), a lookup that misses does not modify the LRU list.

All applications can use the hit/miss indication 114. The entry number 118 and state information 116 provide additional information that may be used by some applications. On a miss, for example, the LRU entry number can be used as a hint for cache eviction.

When the CAM is used as a cache tag store, and each entry is associated with a block of data in local memory 66, the result of the lookup can be used to branch on the hit/miss indicator 134 and use the entry number 118 as a base pointer into the block in Local Memory 66.

The state 116 can be implemented as a single lock bit and the result 112 can be implemented to include a status code (instead of the separate indicator and state fields) along with the entry number 138. For example, the code could be defined as a two-bit code, with possible results to include a "miss" (code '01'), "hit" (code '10') and "locked" (code '11'). A return of the miss code would indicate that the lookup value is not in the CAM, and the entry number of the result value is the Least Recently Used (LRU) entry. As discussed above, this value could be used as a suggested entry to be replaced with the lookup value. A hit code would indicate that the lookup value is in the CAM and the lock bit is clear, with the entry number in the result being the entry number of the entry that has matched the lookup value. A locked code would indicate that the lookup value is in the CAM and the locked bit 116 is set, with the entry number that is provided in the result again being the entry number of the entry that matched the lookup value. The lock bit 116 can be used to differentiate cases where the data associated with the CAM entry is in flight, or pending a change, as will be discussed in further detail later.

A context stage that uses critical data is the only ME that uses that critical data. Therefore, the replacement policy for the CAM entries for a context stage is to replace the LRU on CAM misses. In contrast, a functional pipeline (like the functional pipeline 92 of FIG. 3B) performs the same function on multiple MEs. In a functional pipeline, therefore, a given ME is required to evict all critical data to external memory before it exits a stage that uses critical data and also must ensure that the CAM is cleared prior to any threads using the CAM. Each ME 20 supports a "clear" instruction which, when executed, flushes all information out of the CAM in that ME.

Generally, before a thread uses the critical data, it searches the CAM using a critical data identifier such as a memory address as a lookup value. As described earlier, the search results in one of three possibilities: a "miss", a "hit" or a "lock". If a miss is returned, then data is not saved locally. The thread reads the data from external memory (that is, from the SRAM 38) to replace the LRU data. It evicts LRU data from local memory (SRAM controller cache, or local memory 66) back to external memory, optionally locks the CAM entry and issues a read to get the new critical data from external memory.

In certain applications, as will be described later, the lock is asserted to indicate to other threads that the data is in the process of being read into local memory, or to indicate to the same thread (the thread that initiated the read) that the memory read is still in progress. Once the critical data is returned, the thread awaiting the data processes the data, makes any modifications to the data, writes the modified data to local memory, updates the entry from which LRU data was evicted with the new data and unlocks the CAM entry.

If the result is a lock, the thread assumes that another ME thread is in the process of reading critical data and that it should not attempt to read the data. Instead, it tests the CAM at a later time and used the data when the lock is removed. When the result is a hit, then the critical data resides in local memory.

Specific examples of CAM and local memory use for caching purposes (to achieve folding) will now be described with reference to FIGS. 5-9. In the examples to follow, the threads of an ME execute in strict order. The threads use local inter-thread signaling (via settings in the local CSRs 70) and round-robin thread selection under the control of the context arbiter 53 to maintain strict order.

Figure 5A:
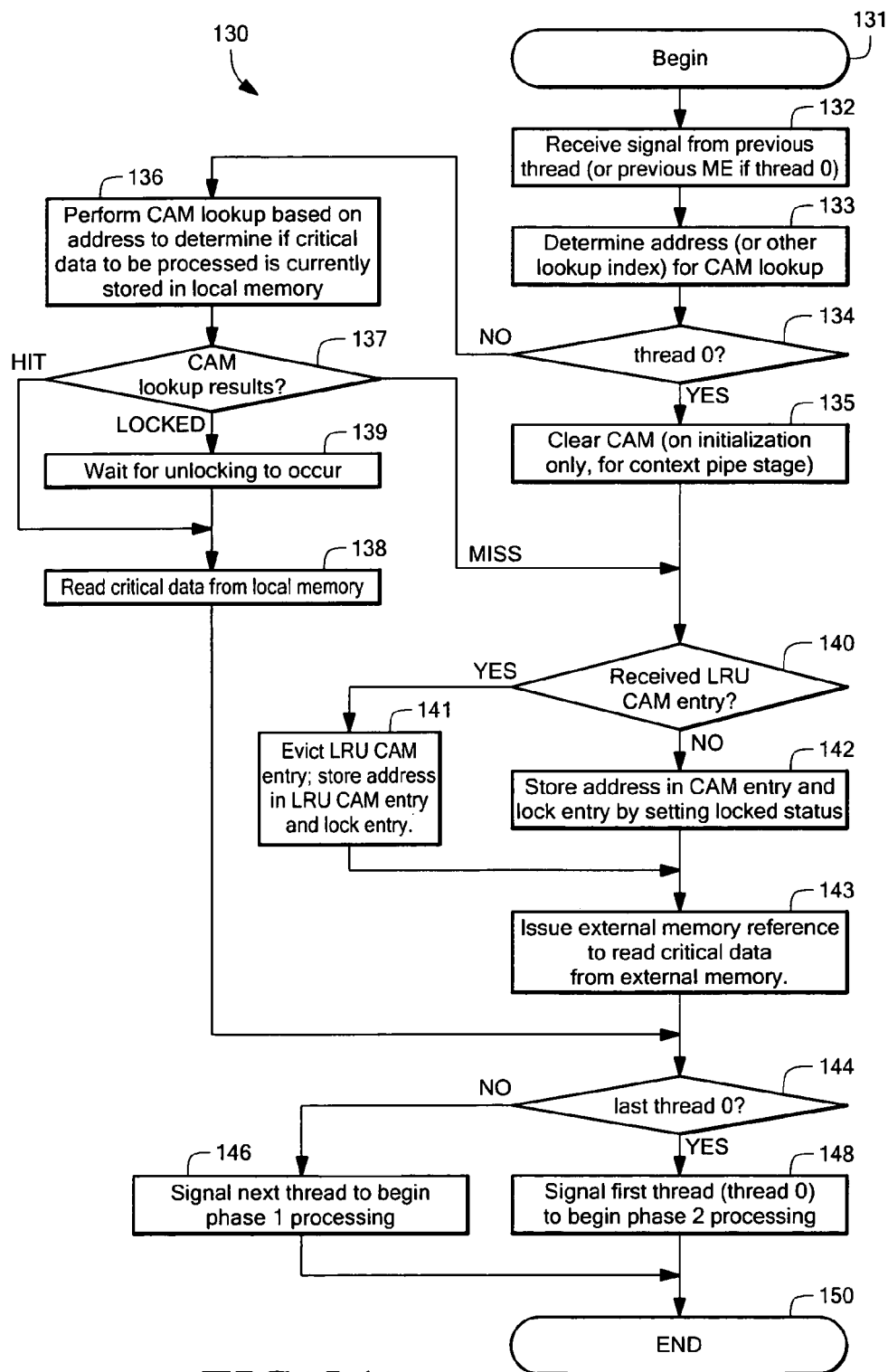
FIGS. 5A-5B are flow diagrams illustrating an exemplary use of the CAM and local memory during a two-phase processing operation by one pipeline stage (one ME) to achieve "folding".
Figure 5B:
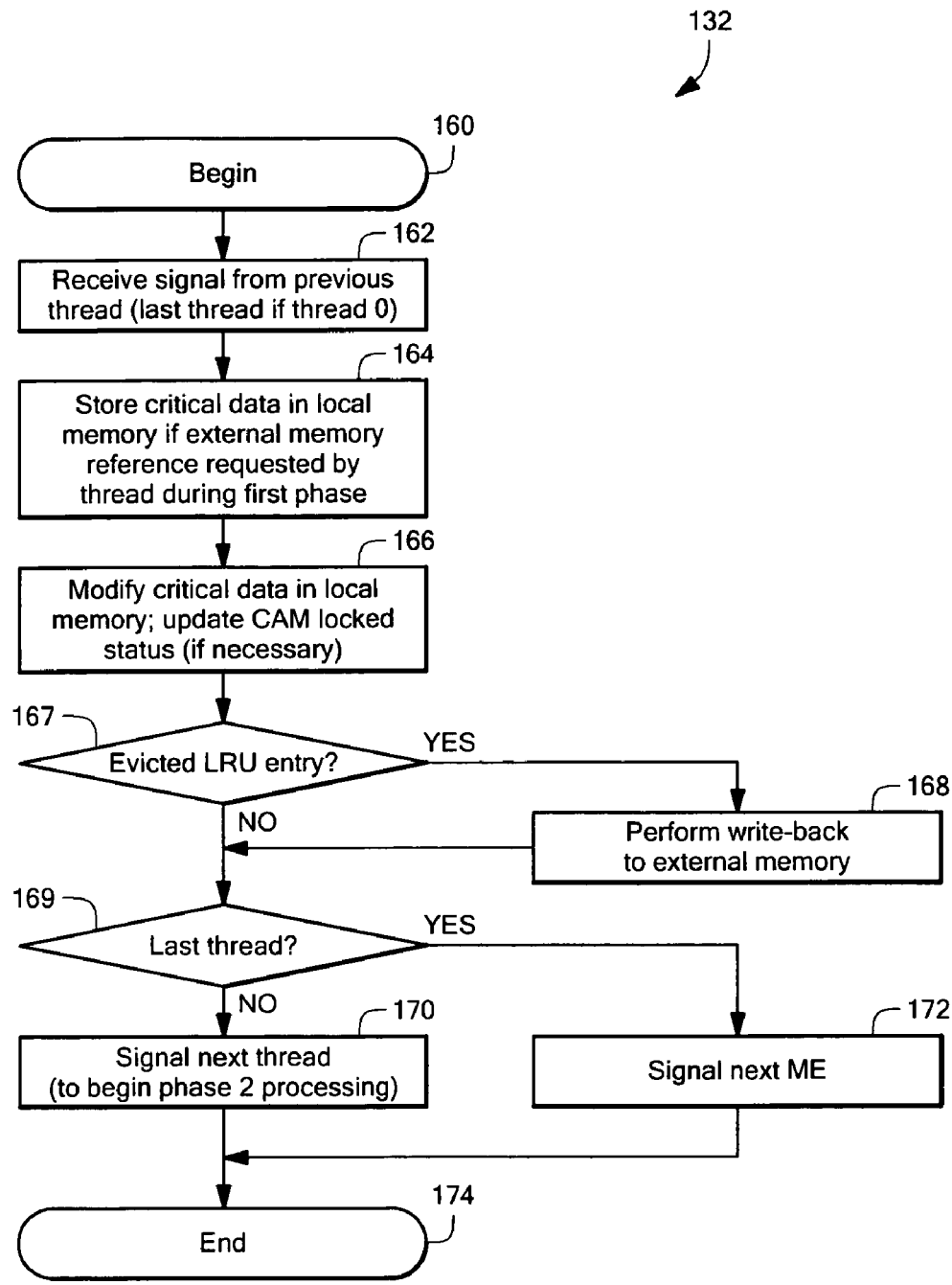

Referring to FIGS. 5A-5B, an exemplary thread processing, which, when executed by all of the threads of an ME stage, achieves a read-modify write with folding, is shown. In this example, the ME stage is a context pipeline (or context pipe) stage. Also, folding is performed in two phases, a read phase 130 (first phase or "phase 1") and a modify-write phase 132 (second phase or "phase 2"). The read phase is responsible for loading critical data from the SRAM 38 into the local memory 66 and managing the CAM 60. The modify-write phase is responsible for modifying the locally stored critical data and writing modified critical data to the SRAM 38 when processing is complete. FIG. 5A illustrates the phase 1 processing 130 and FIG. 5B illustrates the phase 2 processing 132.

A stage is represented by all ME threads, which execute in sequential order, beginning with the first thread and wrapping back to the first thread following last thread. In the case of N=8 threads, with the threads being numbered from 0 through 7, the first thread is thread 0 and the last thread is thread 7. The ME hardware provides independent register sets in the GPR file 56 for each context so that immediate swapping between thread contexts is possible. In the described embodiment, each thread performs the same task for different incoming data units (for example, thread 0 handles data unit n, thread 1 handles data unit n+1, thread 2 handles data unit n+2, and so on). The task duration may be less than or equal to the arrival rate of task assignments from another ME which executes the previous processing stage.

Referring to FIG. 5A, the thread processing 130 begins 131 when the thread receives 132 a signal from a previous thread (or previous ME stage if the thread is thread 0). The thread determines 133 an address (or other lookup identifier), e.g., using information passed to it by a previous ME stage, to be used for performing a CAM lookup. It is determined if the thread is the first thread (thread 0) to execute on the ME (indicated by reference numeral 134). If the thread is thread 0, the thread clears 135 the CAM, but only on initialization. Otherwise, if the CAM does not need to be cleared by the thread, the thread performs 136 a CAM lookup based on the address to determine if the critical data to be processed resides in the local memory 66. If the thread determines 1437 from the CAM lookup results that a CAM hit has occurred, the latency of reading the critical data is eliminated, as the CAM hit indicates that the critical data for the requested address is currently maintained in the local memory. Thus, the thread reads 138 the critical data from local memory. If the CAM results return a lock status, indicating that an external memory reference to read the critical data is already underway, the thread waits 139 until the entry is unlocked by the thread that initiated the external memory reference and then reads from local memory On the other hand, if, at 137, it is determined that the CAM search results indicate a CAM miss, and the thread receives 140 an LRU CAM entry for use, the thread evicts the LRU CAM entry, stores the address in the LRU CAM entry and locks the entry (indicated by reference numeral 141). If a miss is indicated, and the thread does not need to evict LRU data, the thread stores the address in a CAM entry and locks the entry (indicated by reference numeral 142). Once the CAM update is complete, the thread issues 143 an external memory reference to read the critical data from external memory.

Once the external memory read is initiated, or a hit (or lock) is detected, the executing code of the thread determines 144 if the current thread is the last thread. If the thread is not the last thread, the thread signals 146 to the next thread to begin that thread's phase 1 processing. If the thread is the last thread, it signals 148 to the first thread to begin phase 2 processing. After signaling the next thread, the thread stops executing 150. More specifically, a context swap occurs, causing the thread to go to sleep and wait for inter-thread signaling to signal that it is time for the thread to being its phase 2 processing.

Referring to FIG. 5B, the phase 2 thread processing 132 begins 160 (for a thread) when the thread receives 162 a signal from the previous thread (or the last thread, after such thread completes phase 1 processing, if the thread is thread 0). If the thread had accesses external memory in phase 1, the thread stores 164 the critical data returned by the external memory read in the local memory. The thread modifies 166 the critical data in local memory (as well as updates the CAM state to indicate an unlocked state once the modification is complete). If it is determined (at 167) that the thread evicted an LRU entry, the thread performs 168 a write-back to the external memory to write back the local memory critical data associated with the evicted LRU entry. Otherwise, or after the write operation has been initiated, the executing code determines 169 if the current thread is the last thread. If the thread is not the last thread, the thread signals 170 the next thread to begin phase 2 processing. If the thread is the last thread, the thread signals 172 the next ME. The thread again "swaps out" 174, this time to terminate its phase 2 processing.

As noted earlier, inter-thread signaling is used to enforce thread execution order. The processing 130 and 132 are repeated for all thread contexts. Although not shown, it will be understood that the illustrated flow of operation may differ for different types of stages, e.g., a context pipe versus functional pipeline stage, or different policies, such as cache eviction policy, write-back policy and write-through policy. For example, as was illustrated in FIGS. 5A-5B, a context pipe stage may require external memory writes for evicted LRU data in cases of a CAM miss. The thread processing of FIGS. 5A-5B utilizes a write-back policy for a minimum number of external write operations. Alternately, a write-through policy in which each thread writes its own modification of the critical data back to the external memory can be used. For example, in the case of thread processing for a functional pipeline stage (or functional pipe stage), thread 0 would always clear the CAM, and the only writes would occur according to a write-through policy. That is, each thread would write its modified data back to the external memory.

It will be appreciated that the performance achieved by folding depends on fast lookups (so that one thread can determine if any other thread has stored or is in the process of storing the critical data it needs) and local data caching in a local memory for fast access to the critical data. Although folding has been illustrated within the context of two processing phases, it will be understood that the processing can occur in a processing environment in which multiple phases of execution are not utilized.

Figure 6A:
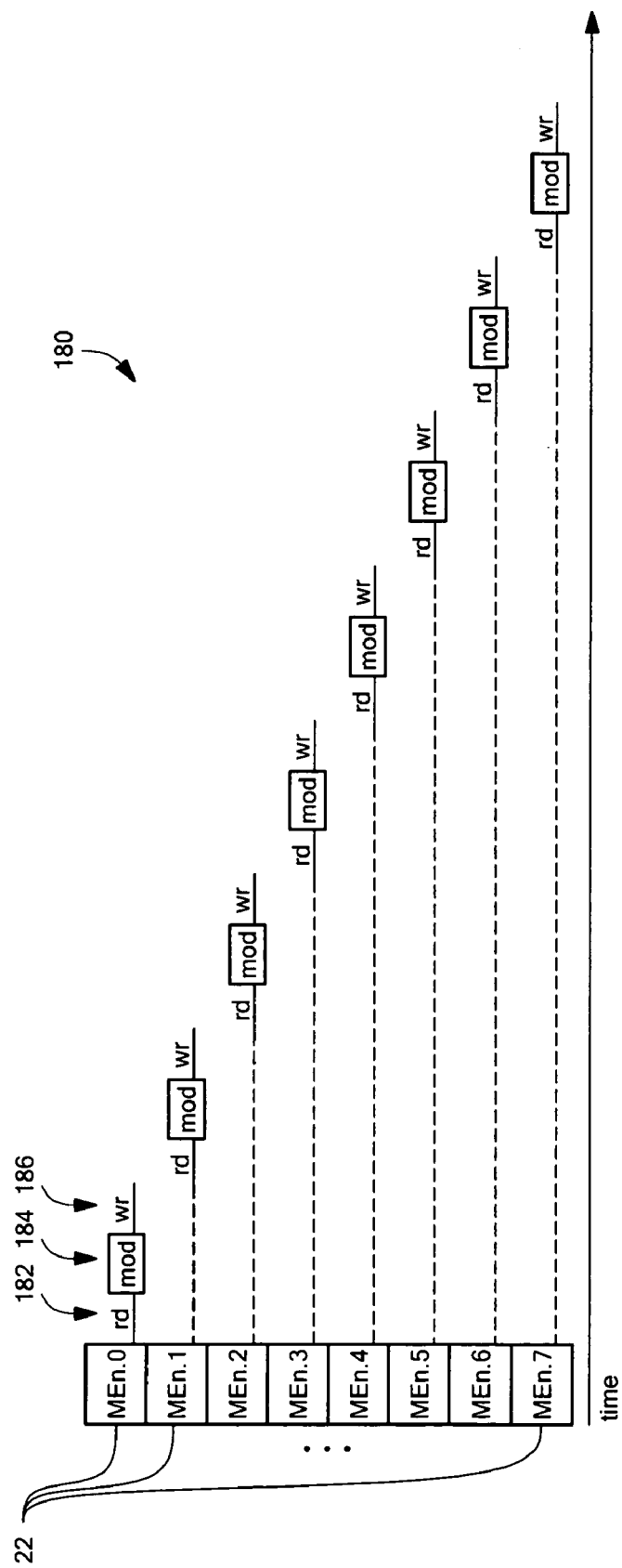
FIGS. 6A-6C are diagrams depicting multi-threaded processing for a given ME stage over time without folding (FIG. 6A), with folding and a write-through caching policy (FIG. 6B), and with folding and a write-back caching policy (FIG. 6C).
Figure 6B:
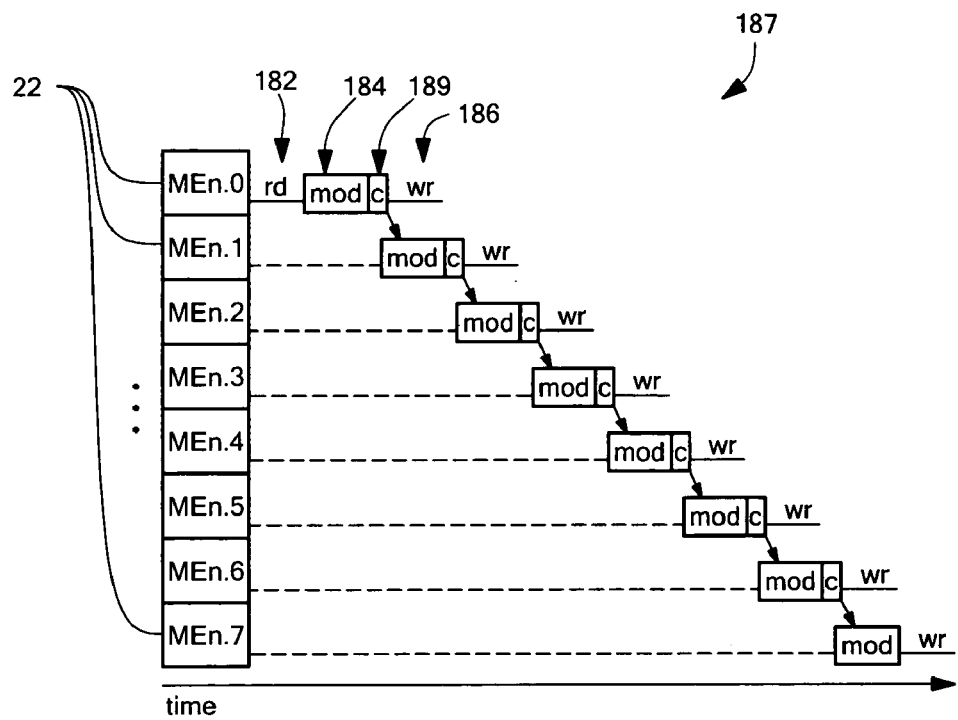
Figure 6C:
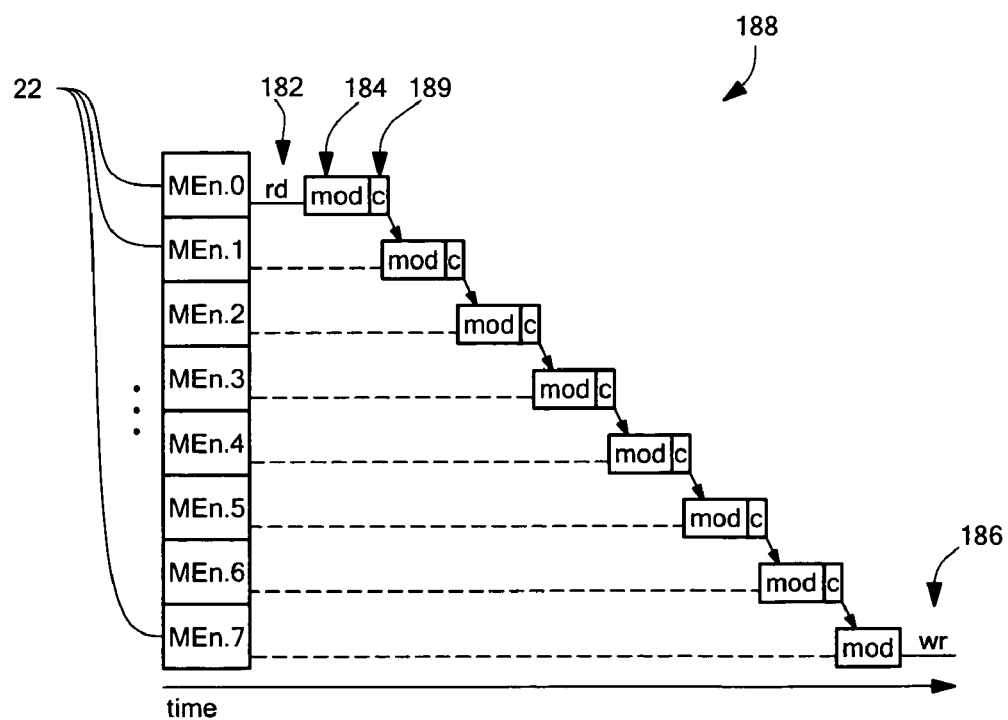

FIGS. 6A-6C illustrate the effects of folding on a stream of 8 dependent, related data units (such as packets) in a given stage. The figure reflects thread execution cycles without phase partitioning. Each of the 8 threads 22 of an ME is assigned a data unit as the data units are received from a previous ME. Each thread is responsible for processing that data unit during this stage. The figures depict, again for the purpose of simplicity, an application in which data units are dependent, back-to-back data units that belong to the same connection and flow. A flow could be, for example, an IP flow (that is, a path through the Internet along which intermediate routers guarantee a specific quality of service), or an ATM virtual circuit. Of course, the data stream could (and typically would) involve a mix of related and unrelated data units where many different flows or connections need to be managed.

Referring to FIG. 6A, thread processing without folding 180 is shown. Each thread 22 needs to perform an external memory read 182 to read critical data from external memory, a modification 184 (of that critical data), and an external memory write 186 to write the modified critical data back to external memory. For a critical section, there is an additional latency with checking a mutex (also in external memory) to determine if the data is critical in the first place. It can be seen that each thread must read the critical data and write the modified critical data multiple times, even if a thread uses the modified critical data from the previous thread.

FIG. 6B shows thread processing with folding and using a write-through policy 187. FIG. 6c shows thread processing with folding and using a write-back policy 188. Referring to both figures, an external memory read 182 of the critical data is performed by the first thread. The critical data is modified (modification 184). After the critical data is modified, the first thread caches the modified critical data in local memory (caching 189). If a next thread operates on that same data unit or data structure, it has immediate access to the modified critical data because that critical data is dependent data and is cached in the local memory. Thus, no external memory read 182 is needed for threads 1 through 7, saving significant time.

At some point, the cached data needs to be written back to the external memory. For a write-back policy, and as mentioned earlier, the thread that evicts the LRU entry performs the write-back. FIG. 6C shows a case in which only the final thread (thread 7) writes the modified critical data back to the external memory. In this particular case, folding results in one read and one write to external memory for a given address. With a write-through policy, as shown in FIG. 6B, the cached critical data is written back to the external memory by each thread after it has been modified by the thread. That write operation is hidden behind subsequent processing by other threads so its latency doesn't lengthen the overall processing time. Here, the rate of read-modify-write therefore amortizes across all threads.

The effect of folding across all threads is that external reads are only performed from thread 0 or from other threads in the case of a CAM miss. For best case folding, the read-modify-write duration for all 8 threads combined is (external read latency+(7*(local memory write latency))+ (7*(local memory read latency))+(8*(calculation cycle))+ external write latency). Thus, the overall delay is much shorter than if the read-modify-write involving a read from and write to the external memory were to be performed by every thread.

Figure 7:
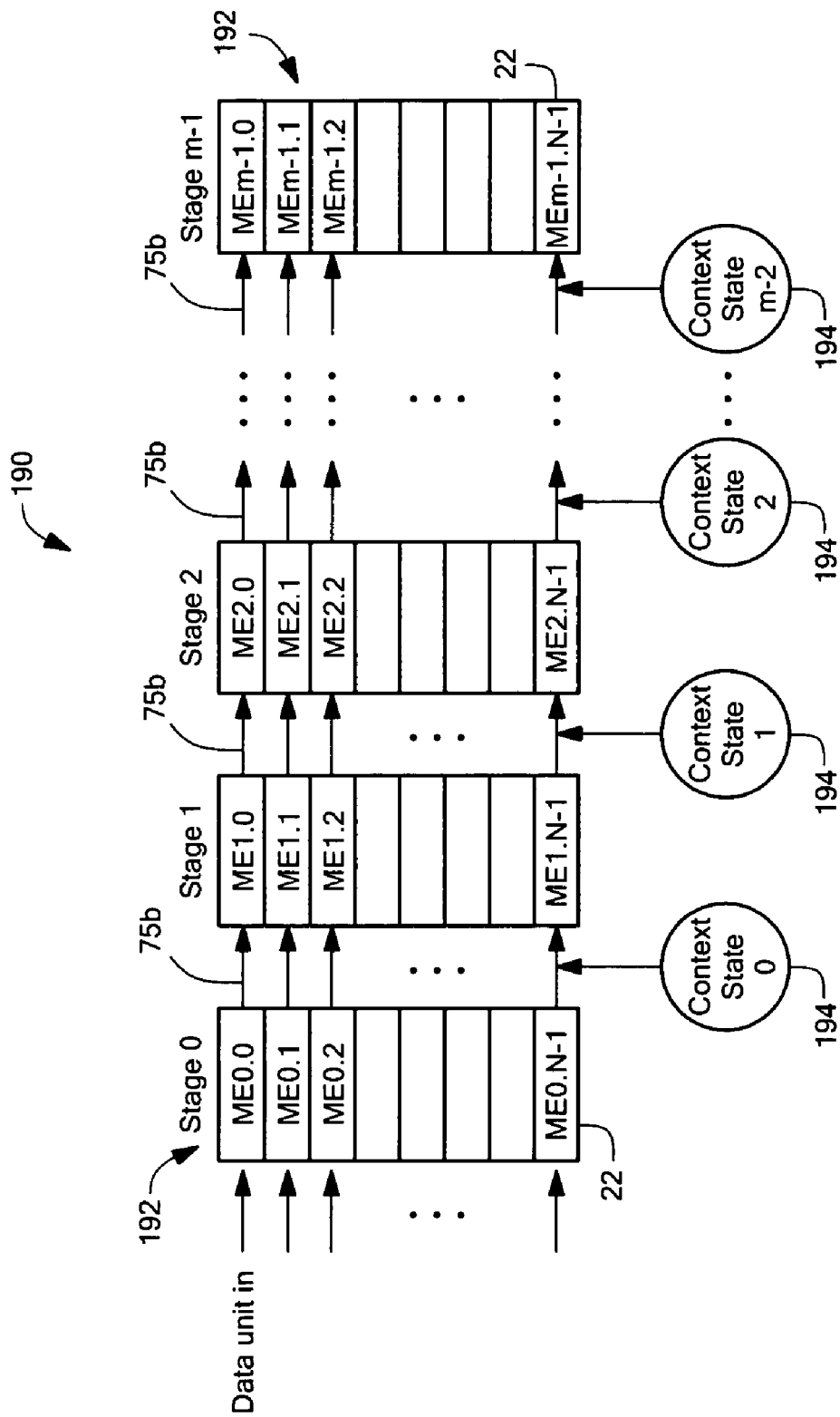
FIG. 7 is a diagram depicting "m" stages operating as a data processor and achieving m levels of folding.

The concept of folding can be extended to multiple stages for multiple levels of folding. As shown in FIG. 7, a data processing pipeline 190 of ("m") folding stages 192 implements m-levels of folding where work for a given function is performed by corresponding threads of adjacent stages in series. For m-levels of folding, thread "i" 22 (where i=0, 1, 2, . . . , N−1) of a first ME 20 hands off directly to a corresponding thread context "i" 22 of the next ME 20. In the illustrated embodiment, this "hand-off" involves thread i of ME "k" (where k=0, 1, 2, . . . , m−1) passing context state 194 to the next neighbor registers of the thread i of the next ME. The CAMs of the MEs are configured identically for duplicate matches by passing the context state to the next ME (via the next neighbor registers 74). Thus, more than one processing iteration is possible for a given data unit or (in the case of context stages, a data context) because multiple threads perform work on the data unit in series. In the case of 2-levels of folding (or "double folding") using two stages, if the arrival rate is one new data unit per 50 cycles, 100 cycles of work can be performed per data unit.

Figure 8A:
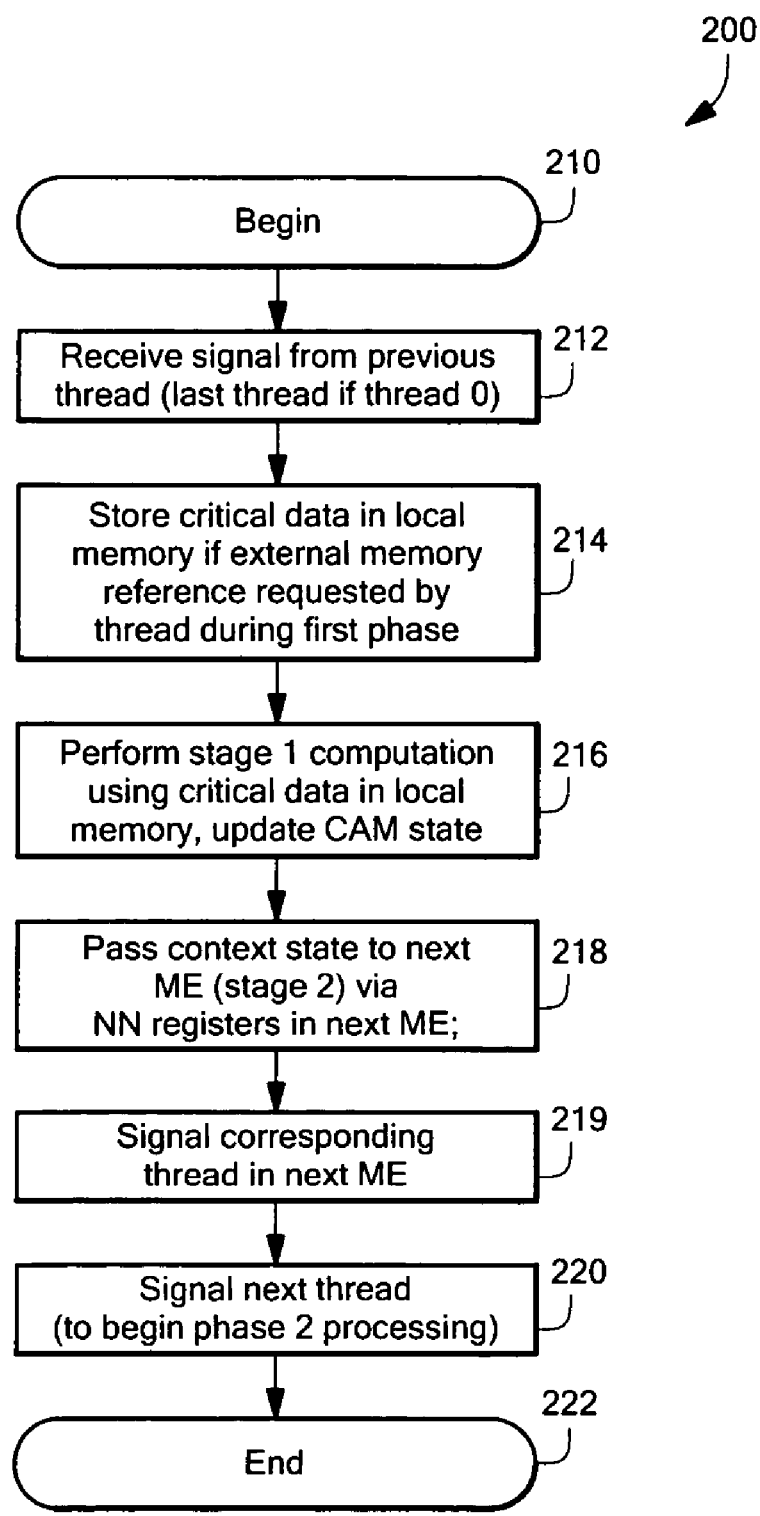
FIGS. 8A-8C are flow diagrams illustrating an exemplary use of the CAM and local memory during two-phase processing operations by two pipeline stages (two MEs) to achieve two levels of folding.
Figure 8B:
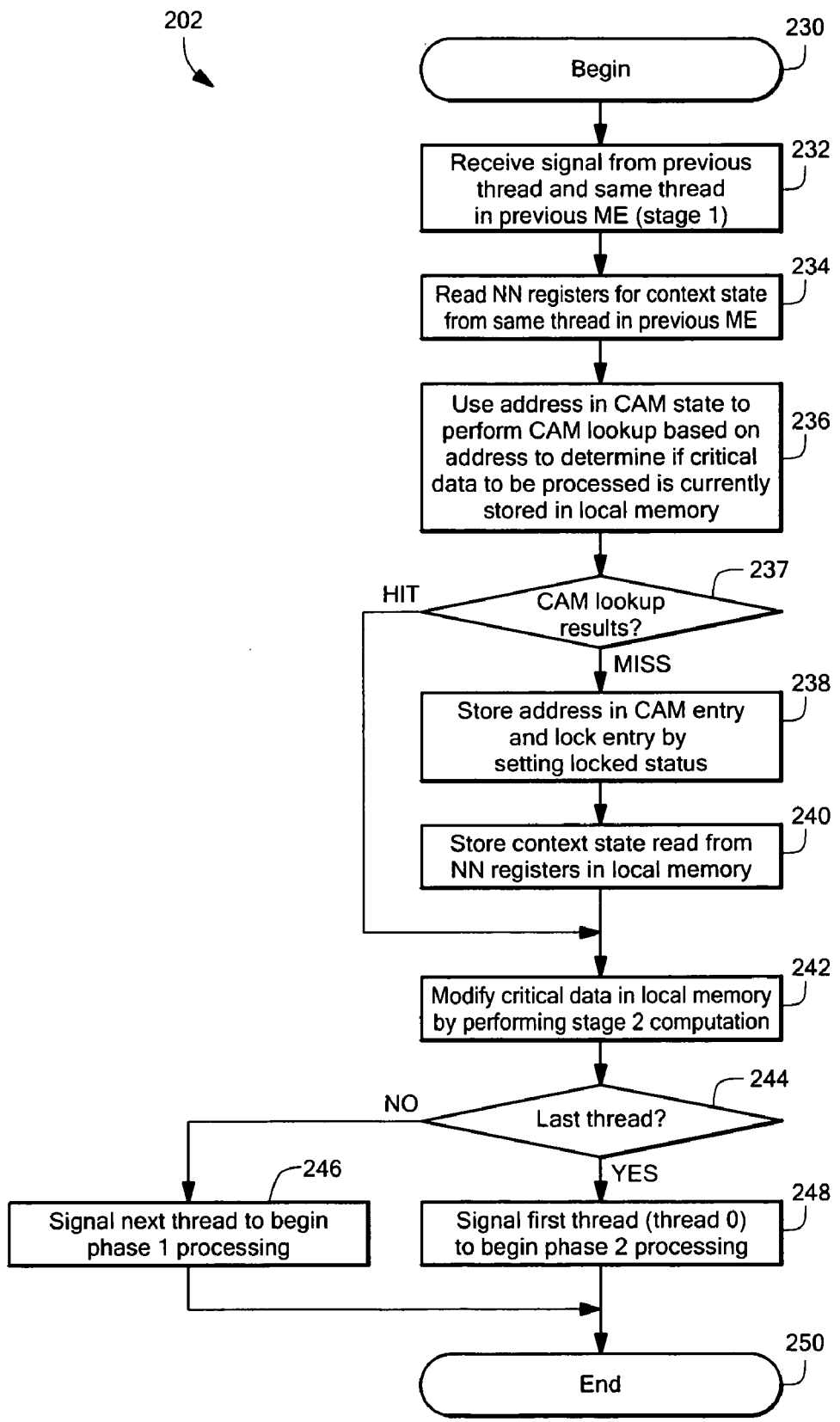
Figure 8C:
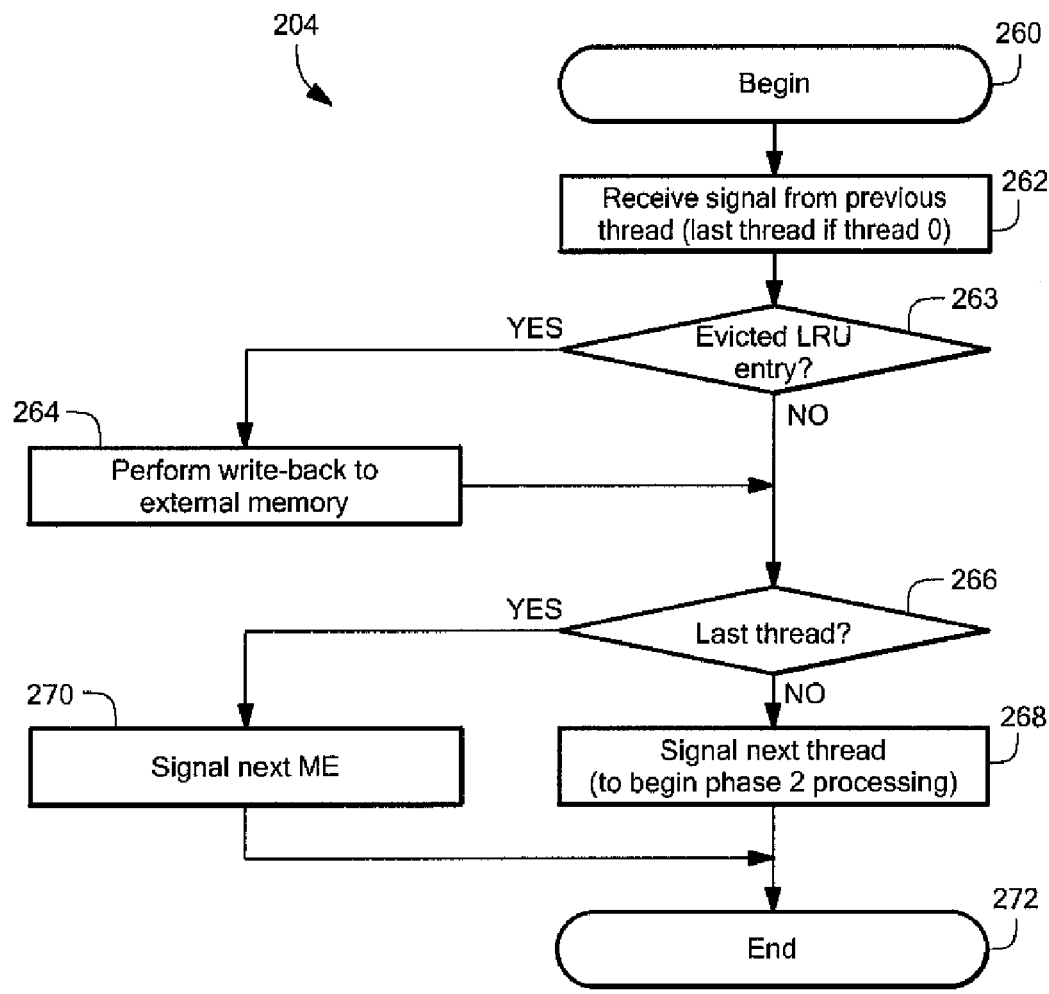

FIGS. 8A-8C illustrate an exemplary context pipe stage thread phase processing for double folding. It will be appreciated that phase 1 of the first stage ("stage 1") is the same as shown in FIG. 5A. FIG. 8A shows thread processing 200 for phase 2 of stage 1. FIG. 8B and FIG. 8C show thread processing 202 for phase 1 and thread processing 204 for phase 2, respectively, of the second stage ("stage 2").

Turning now to FIG. 8A, thread processing 200 begins 210 when the thread receives 212 a signal from the previous thread (or the last thread, after such thread completes phase 1 processing, if the thread is thread 0). If the thread had accessed external memory in phase 1, the thread stores 214 the critical data returned by the external memory read in the local memory. The thread performs 216 a first stage computation using the critical data in local memory (and then updates the CAM state to indicate an unlocked state once the modification is complete, if necessary). The thread passes 218 context state information, including CAM state and associated data structures read from external memory, as well as any computational results needed by stage 2, to a corresponding thread in the next ME (stage 2 ME) via the next neighbor registers in that ME. It also signals 219 the corresponding thread in the stage 2 (via inter-ME signaling, for example, using registers in the external CSRs 32, shown in FIG. 1) to alert that thread that data is waiting in its next neighbor registers. The thread then signals 220 the next thread to begin phase 2 processing and terminates 222 (via a context swap).

Referring to FIG. 8B, the thread processing 202 (for stage 2, phase 1) begins 230 when the thread receives 232 a signal from a previous thread and the corresponding (like-numbered) thread in the previous ME. The thread reads 234 the next neighbor registers for context state information passed to it by the corresponding thread in stage 1. The thread uses 236 the address in the CAM state to perform a CAM lookup based on that address to determine if critical data to be processed is currently stored in local memory. The thread receives 237 the results of the CAM lookup. If the results indicate a CAM miss, the thread stores 238 the address as a CAM entry, setting the locked status in the entry at the same time. The thread stores the context state read from the next neighbor registers in the local memory. After the thread has updated the local memory with the stage 1 information, or in the event of a CAM hit, the thread modifies 242 the critical data in local memory by performing a second stage computation. The executing code determines 244 if the current thread is the last thread. If the thread is not the last thread, it signals 246 to the next thread to begin that thread's phase 1 processing. If the thread is the last thread, it signals 248 the first thread to begin phase 2 processing and swaps out 250.

Referring to FIG. 8C, the stage 2/phase 2 thread processing 204 begins 260 when the thread receives 262 a signal from the previous thread (or the last thread, after such thread completes phase 1 processing, if the thread is thread 0). The thread determines 263 if the thread (or corresponding thread in stage 1) evicted an LRU entry. If so, the thread performs 264 the associated write-back to external memory. The executing code determines 266 if the current thread is the last thread. If the thread is not the last thread, the thread signals 268 the next thread to begin phase 2 processing. If the thread is the last thread, the thread signals 270 the next ME. Thread terminates 272 via a context swap.

Figure 9:
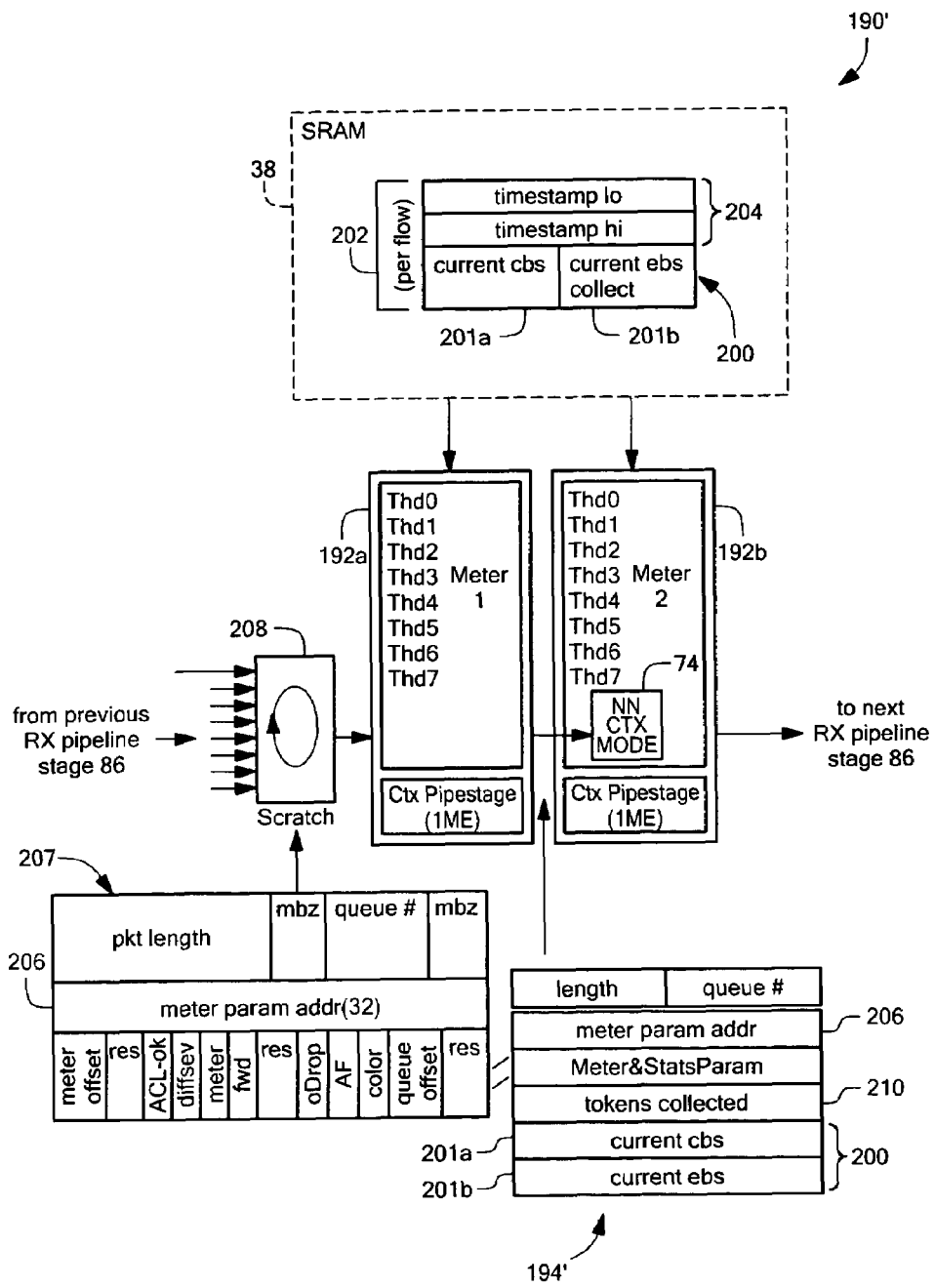
FIG. 9 is a diagram depicting inter-stage CAM context state passing in an example in which two stages are programmed to perform metering processing.

Referring to FIG. 9, an example of a double folding implementation of the data processing pipeline 190 (FIG. 7), shown as data processing pipeline 190', in which stages 192 are configured to perform metering processing (shown as metering stages 192a and 192b), is shown. In this example, the data processing pipeline 190' (that is, the two stage metering function) is part of the RX pipeline 82 and is thus preceded by a stage 86 of the functional RX pipeline 90 and followed by another RX pipeline stage 86, for example, a congestion avoidance stage. In this metering example, the critical data stored in external memory and used by the stages 192a and 192b includes metering parameters 200 (e.g., token buckets (e.g., committed burst token bucket 201a ("current cbs") and excess burst token bucket 201b ("current ebs"), which are stored in per-flow data structures 202 (only one of which is shown) along with other flow-specific information, such as timestamp 204.

The first meter stage (meter 1) 192a performs several activities. Each thread reads a per-flow pointer 206 for the associated metering parameters (typically provided by a previous stage in the RX pipeline 82 and stored in an entry 207 of a scratch ring, e.g., scratch ring 208, as shown), and uses the pointer to read the metering parameters from the external memory (shown here as SRAM 38). The thread uses the metering parameters to perform a stage 1 computation, e.g., to compute a number of tokens collected between a flow's last data unit's arrival time and that of the current data unit. It also updates the timestamp information 204 associated with the metering parameters 200 in SRAM 38. Each thread performs these activities for an incoming data unit (in this case, a data context).

As indicated above with reference to FIGS. 7 and 8A-8C, each thread in stage 1 also passes context state information 194 to the corresponding thread in stage 2 (via the NN registers 74, as discussed earlier). In the metering example, the context state information, shown as 194', may include such information as the computed number of tokens collected 210, as well as any CAM state (including the pointer 206 and associated metering parameters 200 read from external memory required by the second state 192b for CAM coherency. Other information read from the scratch ring may be included as well.

The threads of the second meter stage (meter 2) 192b each perform a stage 2 computation, for example, updating metering parameters such as the token buckets according to a metering scheme such as "single-rate-three-color-marker", using the metering parameters (either passed from stage 1 or stored in local memory already) and the tokens collected as a result of the stage 1 computation, to update the metering information. As the metering parameters have been modified by threads, any of the stage 2 threads that evicted an LRU entry writes the modified metering parameters to local memory.

Although the figures illustrate doubling folding for context pipe stages, it will be understood that functional pipe stages can use the double folding mechanism as well. The differences are as noted earlier. The first stage (phase 1) would clear the CAM, and each thread in the final phase of processing of stage to would write any data that thread had modified to the external memory.

Because both stages use the same metering parameters, the CAMS in the two stages are used to maintain coherency of the metering parameters between the threads and between the stages. This is possible because the ME threads process data units in strict order and any CAM hit in the first stage is guaranteed to be in the CAM of the second stage. The reverse is not true since the first stage will be working on eight new data units while the second stage is processing the eight previous data units.

Metering parameters are but one example of critical data. In network processor applications, other examples of critical data may include CRC computation state information (e.g., residue data), queue management data structures (e.g., queue and cell counts) and congestion avoidance parameters, such as average number of packets in a queue.

Processing that utilizes the folding mechanism can be implemented in software. The software can be stored on a storage medium and loaded into memory of a machine, such as a processor. The execution of the software results in thread processing with folding, as described earlier.

Other embodiments are within the scope of the following claims.

What is claimed is:

1. A method comprising:

processing units of data associated with a dependent data stream using different threads of execution, the threads to execute on a processor configured to operate as a data processing pipeline of stages, each comprising a set of the threads, and corresponding threads in the sets of threads processing the same one of the data units in the stages; and accessing a common data structure in a memory for the processing, using a single read operation to read the common data structure from the memory for caching and a write operation to write back a cached version of the common data structure to the memory;

wherein each of the stages is processed in a read phase comprising the single read operation and a modify-write phase comprising the write operation, the modify-write phase comprises a thread in a current stage providing context information to a register of a next stage and the thread in the current stage alerting a corresponding thread in the next stage of an availability of the context information in the register of the next stage.

2. The method of claim 1 wherein the different execution threads comprise threads controlled to execute in sequential order.

3. The method of claim 1 wherein the processor is coupled to the memory, and accessing the common data structure comprises caching the common data structure in a local memory of the processor after the single read operation is complete.

4. The method of claim 3 wherein the processor includes a Content Addressable Memory (CAM) of entries and caching comprises enabling the first one of the threads to write one of the entries with information indicating that the common data structure is cached in the local memory.

5. The method of claim 4 wherein accessing the common data structure comprises enabling any one of the threads to determine from the CAM entries if the common data structure is already cached in the local memory.

6. The method of claim 1 wherein each of the stages comprises a local memory for caching the common data structure and a CAM to manage the caching of the common data structure, and wherein accessing further comprises:

using the context information provided by the current stage to maintain coherency of contents of the CAM in the next stage.

7. The method of claim 6 wherein the context state information comprises a portion of the common data structure.

8. The method of claim 7 wherein the context state information comprises results of the processing of the current stage.

9. The method of claim 1 wherein the single read operation is performed by a first thread to execute in the threads set of a first one of the stages.

10. The method of claim 1 wherein the write operation is performed by a last thread to execute in the threads set of a last one of the stages.

11. The method of claim 1 wherein the thread is a current thread and the modify-write phase further comprises the current thread signaling a modify-write phase of a next thread in the current stage.

12. The method of claim 1 wherein the read phase comprises beginning when a thread receives a signal from a previous thread.

13. The method of claim 1 wherein the read phase comprises beginning when a thread receives a signal from a previous stage.

14. The method of claim 1 wherein the write operation is a single write operation.

15. An article comprising:
a storage medium having stored thereon instructions that when executed by a machine result in the following:
processing units of data associated with a dependent data stream using different threads of execution, the threads to execute on a processor configured to operate as a data processing pipeline of stages, each comprising a set of the threads, and corresponding threads in the sets of threads processing the same one of the data units in the stages; and
accessing a common data structure in a memory for the processing, using a single read operation to read the common data structure from the memory for caching and a single write operation to write back a cached version of the common data structure to the memory;
wherein each of the stages is processed in a read phase comprising the single read operation and a modify-write phase comprising the write operation, the modify-write phase comprises a thread in a current stage providing context information to a register of a next stage and the thread in the current stage alerting a corresponding thread in the next stage of an availability of the context information in the register of the next stage.

16. The article of claim 15 wherein the different execution threads comprise threads controlled to execute in sequential order.

17. The article of claim 15 wherein the processor is coupled to the memory, and accessing the common data structure comprises caching the common data structure in a local memory of the processor after the single read operation is complete.

18. The article of claim 15 wherein the processor includes a Content Addressable Memory (CAM) of entries and caching comprises enabling the first one of the threads to write one of the entries with information indicating that the common data structure is cached in the local memory.

19. The article of claim 18 wherein accessing the common data structure comprises enabling any one of the threads to determine from the CAM entries if the common data structure is already cached in the local memory.

20. The article of claim 15 wherein each of the stages comprises a local memory for caching the common data structure and a CAM to manage the caching of the common data structure, and wherein accessing further comprises:
using the context information provided by the current stage to maintain coherency of contents of the CAM in the next stage.

21. The article of claim 20 wherein the context state information comprises a portion of the common data structure.

22. The article of claim 20 wherein the context state information comprises results of the processing of the current stage.

23. The article of claim 15 wherein the single read operation is performed by a first thread to execute in the threads set of a first one of the stages.

24. The article of 15 wherein the write operation is performed by a last thread to execute in the threads set of a last one of the stages.

25. A network processor comprising:
processors to process data associated with a data stream using different execution threads; and
wherein the processors are operable to access at least one common data structure in a memory using a single read operation to read the common data structure from the memory for caching and a write operation to write back a cached version of the at least one common data structure to the memory, for the processing, the processors are operable to process each data unit in stages, each stage corresponding to a different one of the processors; and
wherein each of the stages is processed in a read phase comprising the single read operation and a modify-write phase comprising the write operation, the modify-write phase comprises a thread in a current stage providing context information to a register of a next stage and the thread in the current stage alerting a corresponding thread in the next stage of an availability of the context information in the register of the next stage.

26. The processor of claim 25 wherein the thread is a current thread and the modify-write phase further comprises the current thread signaling a modify-write phase of a next thread in the current stage.

27. The processor of claim 25 wherein the read phase comprises beginning when a thread receives a signal from a previous thread.

28. The processor of claim 25 wherein the read phase comprises beginning when a thread receives a signal from a previous stage.

29. The processor of claim 25 wherein the write operation is a single write operation.

* * * * *